United States Patent [19]

Gottshall

[11] 4,043,534

[45] Aug. 23, 1977

[54] SEALING MEANS FOR SLIDING GATE VALVE

[75] Inventor: Edward R. Gottshall, Bethlehem, Pa.

[73] Assignee: Mosser Industries, Inc., Allentown, Pa.

[21] Appl. No.: 722,820

[22] Filed: Sept. 13, 1976

[51] Int. Cl.$^2$ .................. F16K 3/312; F16K 3/316
[52] U.S. Cl. ............................ 251/174; 251/326; 138/94.3; 126/285 A
[58] Field of Search ............... 138/94.3; 251/326, 176, 251/174; 126/285 A

[56] References Cited

U.S. PATENT DOCUMENTS

| | | | |
|---|---|---|---|
| 1,065,839 | 6/1913 | Ritzman | 138/94.3 |
| 1,868,147 | 7/1932 | Kruse | 251/326 X |
| 2,489,915 | 11/1949 | Loewenheim | 126/285 |
| 2,996,063 | 8/1961 | Lowe | 126/285 |
| 3,084,715 | 4/1963 | Scharres | 137/601 |
| 3,228,389 | 1/1966 | Lowe et al. | 126/285 A |
| 3,377,047 | 4/1968 | Scholl | 251/175 |
| 3,565,393 | 2/1971 | Trythall | 251/326 X |
| 3,760,593 | 9/1973 | Whipps | 251/326 X |
| 3,897,932 | 8/1975 | Hale | 251/326 X |

*Primary Examiner*—Arnold Rosenthal
*Attorney, Agent, or Firm*—Sutherland, Asbill & Brennan

[57] ABSTRACT

Sealing means for a sliding gate valve with a frame having a bottom frame member, a top frame member with an aperture therein generally transverse to the direction of fluid flow through the valve, and parallel, rectilinear side frame members and a gate having parallel, rectilinear sides adapted for sliding movement through the aperture to a closed position within the frame to restrict the flow of fluid through the frame. The seal is effected by a flange that is fixedly mounted on at least one frame member downstream of the aperture and in the interior of the frame and is parallel to the gate, and a longitudinal strip of resilient material fixedly mounted on at least one side frame member in the interior of the frame and in the plane of the gate. The flange is adapted to contact the downstream surface of the gate and limit the gate's downstream displacement due to the pressure of fluid when it is in the closed position and subjected to fluid pressure against its upstream surface. The longitudinal strip has a curved transverse cross-section and is adapted to effect compressed, sealing contact along the apex of its convex surface with the side edge of the gate in the closed position.

16 Claims, 4 Drawing Figures

U.S. Patent   Aug. 23, 1977   Sheet 1 of 2   4,043,534
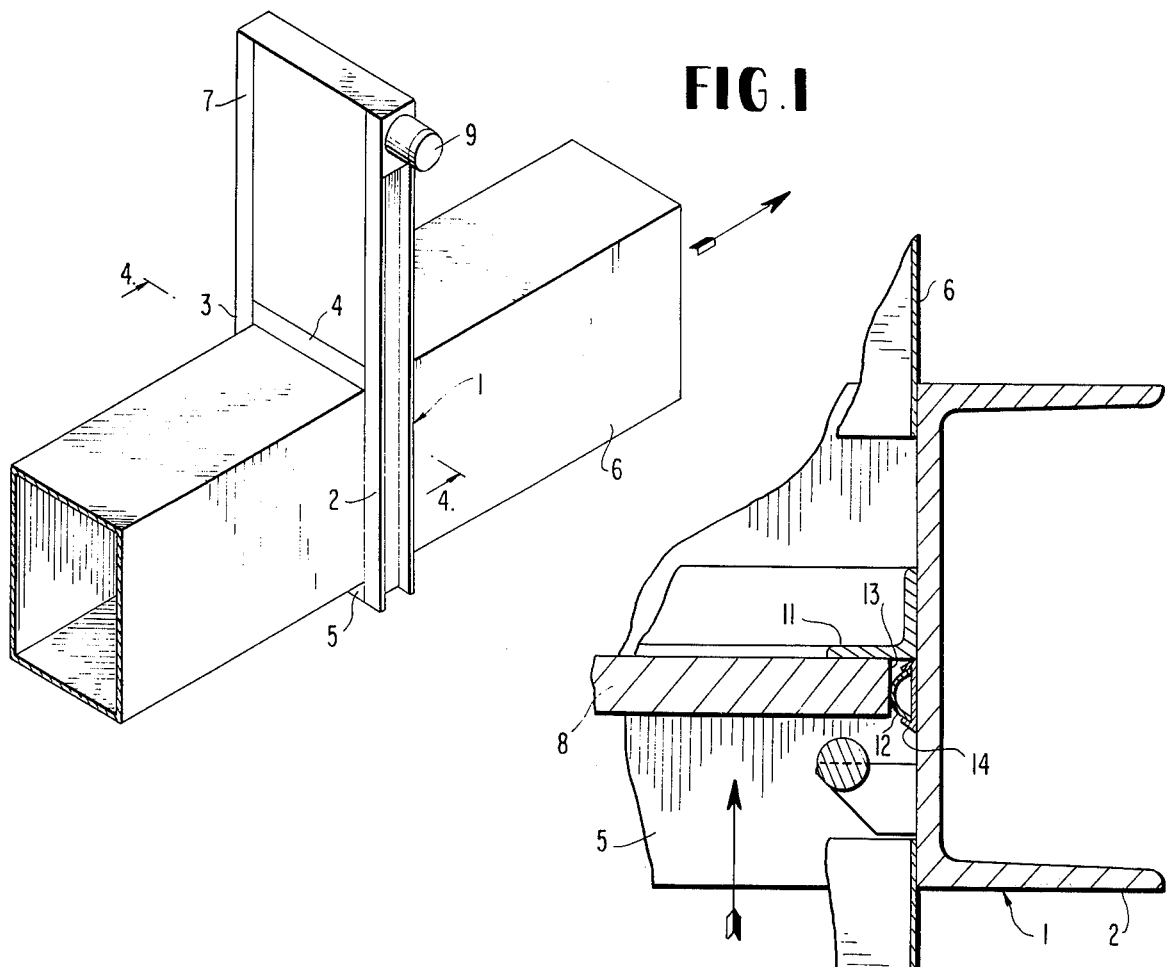
FIG. 1
FIG. 3
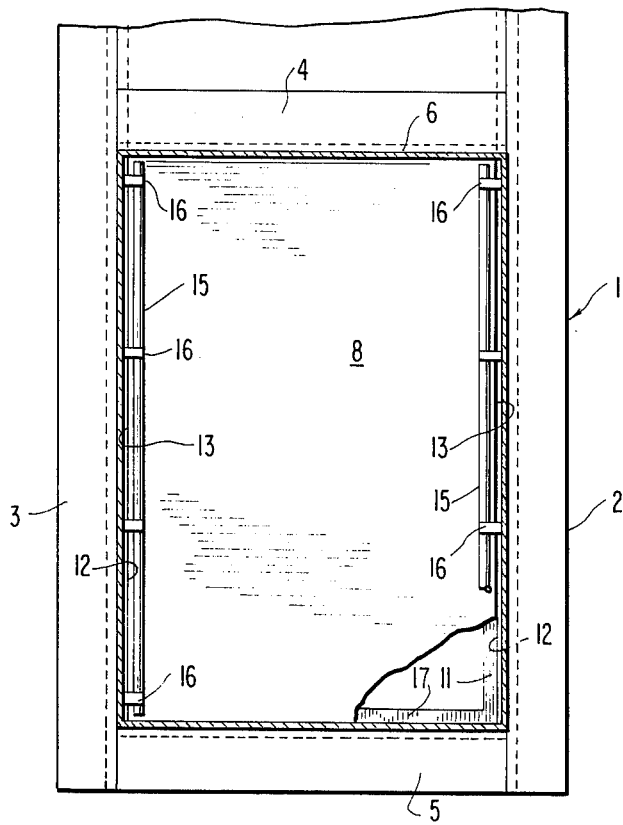
FIG. 4

SEALING MEANS FOR SLIDING GATE VALVE

This invention relates to sliding gate valves for controlling the flow of fluids, especially gases in high temperature applications, and an improved sealing means for these valves.

Sliding gate valves are commonly employed in power plants to control the flow through a conduit of high velocity flue gases at high temperatures, such as oil ash, coal ash, saturated acid flue gas, and electric arc furnace off gas. For example, such a valve may be used in suspended hot gas ducts from a furnace plenum. In a gate valve of this type, the gate is mounted in a frame and slides across a flow path within the frame to a closed position to restrict the flow of hot gases. Leakage may occur at the points of contact between the gate and the frame and there is a pronounced tendency to leakage past the side edges of the gate. Reduction of such leakage is necessary both to provide high precision control of fluid flow and to permit safe access to the conduit for maintenance.

The present invention provides an improved sealing means for sliding gate valves which affords a substantially gas tight seal between the edges of the gate and the adjacent frame structure when the gate is adjusted to closed position. The improvement resides in the use of a flange that is fixedly mounted on at least one frame member downstream of the aperture and in the interior of the frame and is parallel to the gate, and a longitudinal strip of resilient material fixedly mounted on at least one side frame member in the interior of the frame and in the plane of the gate. The flange is adapted to contact the downstream surface of the gate and limit the gate's downstream displacement due to the pressure of fluid when it is in the closed position and subjected to fluid pressure against its upstream surface. The longitudinal strip has a curved transverse cross-section and is adapted to effect compressed, sealing contact along the apex of its convex surface with the side edge of the gate in the closed position. The side edge of the gate slides along the spring strip to provide a continuous fit. The curved shape has increased strength compared to a leaf spring mounted on the gate or frame and is not subject to crumbling which can occur in such leaf springs when subjected to the sliding motion of the gate due to contact of the leaf spring with a small protrusion on the gate, such as a welding spot or a small deposit of flue dust.

The above and other advantages, features, and characteristics of the invention are disclosed in further detail in the following detailed description. Throughout this description, reference is had to the accompanying drawings in which FIG. 1 is a perspective view of the sliding gate valve and conduit in its structural environment;

FIG. 3 is a top, fragmentary, sectional, view, taken along line 3—3 of FIG. 2;

FIG. 4 is a fragmentary view taken from upstream of the sliding gate valve of this invention.

Figure 2:
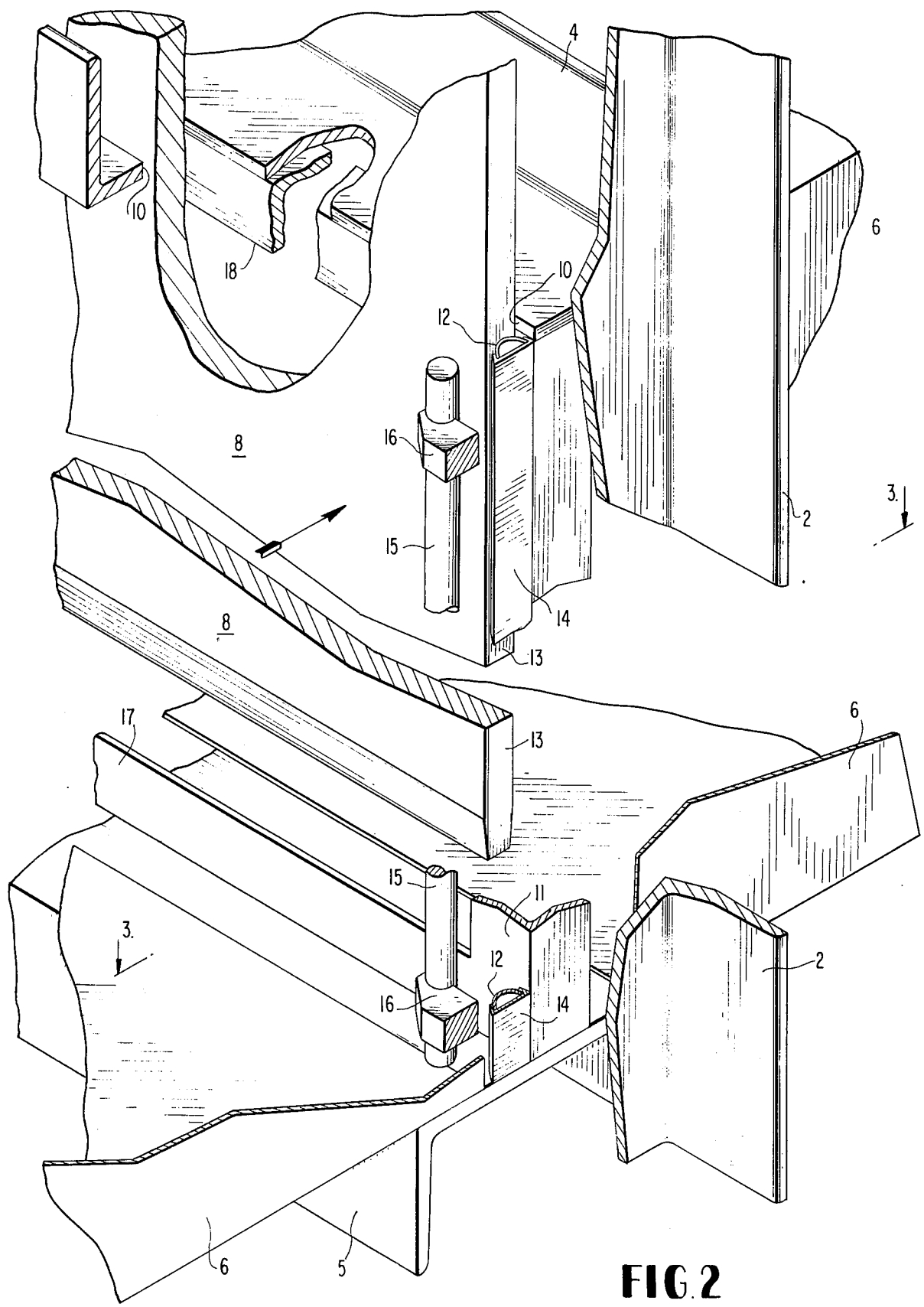
FIG. 2 is an enlarged, detailed, fragmentary, perspective view of the sealing means of this invention.

The rectangular, single gate valve shown in the drawings has a frame 1 constructed of metal or any other rigid material capable of maintaining its shape at the operating temperatures of the valve. Frame 1 is adapted to be fitted in a conduit 6 or other passage for the transport and containment of a fluid medium. Frame 1 comprises parallel, rectilinear side frame members 2 and 3 connected at their upper and lower ends by top and bottom frame members 4 and 5. Frame members 2, 3, 4, and 5 may be welded or otherwise secured together to form a rigid rectangular structure adapted to be fitted into a conduit or other passage. In the preferred embodiment shown in the drawings, frame members 2, 3, 4, and 5 have a U-shaped transverse cross-section, with the U opening outwardly, but may be plate weldments of comparable thickness. Top frame member 4 has an aperture 10 that is generally transverse to the direction of fluid flow through the valve.

A gate housing 7 is mounted on top frame member 4 for containment and storage of a gate 8. Gate 8 has parallel, rectilinear sides 13 adapted for sliding movement through aperture 10 to a closed position within frame 1 to restrict the flow of fluid through the valve. A motor 9 cooperates with means well known in the art (not shown) to move gate 8 between the open and closed positions.

Gate 8 extends longitudinally across frame 1 and slides down from gate housing 7 through aperture 10 to effect flow control of the fluid medium. Gate 8 is shown as a flat guillotine-type, rigid blade that is of rectangular form. Gate 8 may be rigid and slide bodily across frame 1 or it may be flexible and rolled and unrolled as it enters and exits frame 1.

The fragmented view presented in FIG. 2 illustrates an embodiment of the sealing means of this invention employed between gate 8 and side frame member 2, top frame member 4, and bottom frame member 5 when the valve is in the closed position. A flange 11 is fixedly mounted on side frame member 2 downstream of aperture 10 and in the interior of frame 1. Flange 11 is parallel to gate 8 and contacts the downstream surface of gate 8 and limits the downstream displacement of gate 8 when it is in the closed position. An identical sealing flange may be provided on side frame member 3 to provide a seal at the opposite side of the valve. The arrow in FIG. 2 defines the direction of fluid flow in the conduit. Fluid flow against the upstream surface of gate 8 presses the downstream surface of gate 8 into sealing contact with flange 11. Flanges 17 and 18 may be fixedly mounted in the interior of frame 1 on top and bottom frame members 4 and 5, respectively, downstream of aperture 10 and parallel to gate 8 to provide sealing contact between gate 8 and top and bottom frame members 4 and 5. Alternatively, the top edge of gate 8 may be sealed within aperture 10 by resilient, fluid-impermeable, cooperating flat sealing strips mounted on opposing sides of aperture 10 as disclosed in U.S. Patent application Ser. No. 639,871, filed Dec. 10, 1975 which is incorporated herein by reference. A continuous downstream sealing flange may be provided by flanges mounted on all the frame members and joined together to form one uninterrupted, continuous flange protruding from the inner wall of frame 1.

A longitudinal strip 12 of resilient material is fixedly mounted on side frame member 2 in the interior of frame 1 and in the plane of gate 8. Strip 12 has a curved transverse cross-section and is adapted to effect compressed sealing contact along the apex of its convex surface with a side edge 13 of gate 8 when in the closed position. Preferably, strip 12 extends the entire length of side frame member 2 and is mounted in a channel member 14 that is secured to side frame member 2, channel member 14 being formed with mutually inclined side walls adapted to hold spring strip 12 in resilient position in the channel. Spring strip 12 may be formed of spring tempered sheet metal having suitable resistance against heat and corrosion, such as heat resisting steel, Monel or other nickel alloys, and titanium sheet. In high temperature applications it has been found that a spring strip thickness of about 0.009 to 0.012 inch, e.g., about 0.012 inch, is preferred. In closing the gate valve, side edge 13 of gate 8 slides along and compresses spring strip 12. The extent of compression of spring strip 12 affects the amount of sealing contact with side edge 13 of gate 8. An identical longitudinal strip may be fixedly mounted on side frame member 3 to provide a seal at the opposite side of the valve.

A rod 15 is fixedly mounted upstream of aperture 10 and in the interior of frame 1 on side frame member 2 by means of side guide flange plates 16 which are attached to the side frame member 2 of frame 1 at spaced intervals. The preferred length of the intervals depends upon the size of the valve. In a valve measuring 96 inches on a side, the spaces are preferably about 10 to 14 inches.

Rod 15 is parallel to gate 8 and contacts the upstream surface of gate 8 during the gate's sliding movement and cooperates with downstream flange 11 to form a guide channel for gate 8. A rod identical to rod 15 may be fixedly mounted on side frame member 3 to form a guide for sliding movement of the gate at both sides of frame 1. FIG. 4 shows rods 15 mounted in guide flange plates 16 at both sides of frame 1. The use of spaced, upstream, inner side wall guide flange plates 16 is preferred over a continuous upstream flange member directly affixed to the side frame member 2, since the latter tends to form a pocket for the accumulation of foreign matter in the guide channel.

I claim:

1. A sliding gate valve for controlling the flow of a fluid comprising
    a. a frame having a bottom frame member a top frame member with an aperture therein generally transverse to the direction of fluid flow through the valve, and parallel, rectilinear side frame members;
    b. a gate having parallel, rectilinear sides adapted for sliding movement through the aperture to a closed position within the frame to restrict the flow of fluid through the frame;
    c. at least one of the frame members having fixedly mounted thereon, downstream of the aperture and in the interior of the frame, a flange which is parallel to the gate and adapted to contact the downstream surface of the gate and limit the gate's downstream displacement when it is in the closed position and subjected to fluid pressure against its upstream surface; and
    d. at least one of the side frame members having fixedly mounted thereon, in the interior of the frame and in the plane of the gate, a longitudinal strip of resilient material having a curved transverse cross-section, said strip being adapted to effect compressed, sealing contact along the apex of its convex surface with the side edge of the gate when in the closed position.

2. The valve of claim 1 wherein the frame is rectangular.

3. The valve of claim 1 wherein both side frame members have said flanges mounted thereon.

4. The valve of claim 3 wherein both side frame members have said longitudinal strips mounted thereon.

5. The valve of claim 3 wherein the bottom and both side frame members have said flanges mounted thereon.

6. The valve of claim 4 wherein all of the frame members have said flanges mounted thereon, said flanges being joined together to form one, uninterrupted, continuous flange protruding from the inner wall of the frame.

7. The valve of claim 4 wherein each of said longitudinal strips extends the entire length of the side frame member.

8. The valve of claim 6 wherein each of said longitudinal strips extends the entire length of the side frame member.

9. The valve of claim 2 wherein each frame member has a U-shaped transverse cross-section, with the U opening outwardly.

10. The valve of claim 1 wherein the longitudinal strip is retained in a channel member that is secured to the side frame member, said channel member having mutually inclined side walls adapted to hold the strip in resilient position in the channel.

11. The valve of claim 4 wherein each longitudinal strip is retained in a channel member that is secured to the side frame member, said channel member having mutually inclined side walls adapted to hold the strip in resilient position in the channel.

12. The valve of claim 1 wherein the longitudinal strip is formed of spring-tempered sheet metal.

13. The valve of claim 10 wherein the longitudinal strip is formed of spring-tempered sheet metal.

14. The valve of claim 11 wherein each longitudinal strip is formed of spring-tempered sheet metal.

15. The valve of claim 1 wherein at least one of the side frame members has fixedly mounted thereon, upstream of the aperture and in the interior of the frame, a rod which is parallel to the gate and adapted to contact the upstream surface of the gate during sliding movement of the gate.

16. The valve of claim 14 wherein each of the side frame members has fixedly mounted thereon, upstream of the aperture and in the interior of the frame, a rod which is parallel to the gate and adapted to contact the upstream surface of the gate during sliding movement of the gate.

* * * * *